US006791489B1

(12) United States Patent
Richardson et al.

(10) Patent No.: US 6,791,489 B1
(45) Date of Patent: Sep. 14, 2004

(54) RADIO TAG FOR LFM RADAR

(75) Inventors: David L. Richardson, Arlington Heights, IL (US); Andrzej Sobski, Niles, IL (US); Kenneth D. Gorham, Palatine, IL (US); Scott A. Stratmoen, Arlington Heights, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 760 days.

(21) Appl. No.: 09/804,355

(22) Filed: Mar. 12, 2001

(51) Int. Cl.[7] .................. G01S 13/74; G01S 13/89; G01S 13/90
(52) U.S. Cl. .............. 342/43; 342/25; 342/27; 342/42; 342/51; 342/82; 342/89; 342/159; 342/175; 342/195
(58) Field of Search ............... 342/25, 27–51, 342/82–103, 159, 175, 192–197; 340/10.1–10.6, 500, 501, 505

(56) References Cited

U.S. PATENT DOCUMENTS

| | | | |
|---|---|---|---|
| 3,969,725 A | * 7/1976 | Couvillon et al. ............ 342/47 |
| 4,109,247 A | 8/1978 | Kaplan |
| 4,724,427 A | 2/1988 | Carroll |
| 4,746,830 A | 5/1988 | Holland |
| 4,786,906 A | * 11/1988 | Krogager .................... 342/25 |
| 5,051,741 A | 9/1991 | Wesby |
| 5,469,170 A | * 11/1995 | Mariani ....................... 342/51 |
| 5,486,830 A | * 1/1996 | Axline et al. ................. 342/43 |
| 5,495,248 A | * 2/1996 | Kawase et al. ............... 342/25 |
| 5,525,993 A | 6/1996 | Pobanz et al. |
| 5,565,858 A | 10/1996 | Guthrie |
| 5,602,538 A | 2/1997 | Orthmann et al. |
| 5,627,517 A | 5/1997 | Theimer et al. |
| 5,629,691 A | 5/1997 | Jain |
| 5,640,151 A | 6/1997 | Reis et al. |
| 5,686,902 A | 11/1997 | Reis et al. |
| 5,767,802 A | * 6/1998 | Kosowsky et al. ........... 342/45 |
| 5,774,876 A | 6/1998 | Woolley et al. |
| 5,798,693 A | 8/1998 | Engellenner |
| 5,804,810 A | 9/1998 | Wolley et al. |
| 5,821,895 A | * 10/1998 | Hounam et al. .............. 342/25 |
| 5,822,683 A | 10/1998 | Paschen |
| 5,856,788 A | 1/1999 | Walter et al. |
| 5,872,520 A | 2/1999 | Seifert et al. |
| 5,892,441 A | 4/1999 | Woolley et al. |
| 6,433,671 B1 | * 8/2002 | Nysen ..................... 340/10.41 |
| 6,577,266 B1 | * 6/2003 | Axline ........................ 342/42 |

OTHER PUBLICATIONS

R.M. Axline et al, "Radar Transponder Apparatus and Signal Processing Technique"; Sandia National Laboratories Albuquerque, N.M.; Published 1994.*

* cited by examiner

Primary Examiner—Bernarr Earl Gregory
(74) Attorney, Agent, or Firm—Stetina Brunda Garred & Brucker (57) ABSTRACT

An RFID system using encoded digital information utilizing pulsed linear frequency modulation (LFM). The LFM waveform is sent from an aircraft or satellite and is received by a transponder. The LFM waveform is demodulated using both, an AM and an FM receiver. The demodulated data is compared to preprogrammed criteria tables, and after validation is decoded and utilized. Algorithms in the transponder are used to determine the frequency deviation and for calculating the direction of the slope of the LFM input signal. The valid RF signal is stored in a delay element, encoded with the transponder data using phase modulation (PM), and frequency modulation (FM). The tag transmission is synchronized to the input LFM waveform. The transmit/receive chopping signal prevents unwanted oscillations and is capable of randomization.

26 Claims, 10 Drawing Sheets

```
TRANSITION = 0
CYCLES = 0
CYCLES_TEMP = 0
CLOCK = 2e6
FOR (n=2; n<=DATA; n++)
        IF ((SS[n] == 1) && (SS[n-1] == 1))
                CYCLES_TEMP = CYCLES_TEMP +1
                CYCLES = CYCLES +1
                IF (SLIN [n-1] != SLIN[n])
                        TRANSITION = TRANSITION + 1
                        CYCLES_TEMP = 1
                ELSE
                IF (TRANSITION == 0)
                        CYCLES = 0
                        CYCLES_TEMP = 0
                ELSE
        ELSE
CYCLES = CYCLES - CYCLES_TEMP
IF (CYCLES <= 0)
        CYCLES = 1
ELSE
FREQUENCY_ESTIMATE = (TRANSITION - 1) * CLOCK / (CYCLES * 2)
```

NOTE: LOGIC HIGH IS SWITCH OPEN, LOGIC LOW IS SWITCH CLOSED.

*Fig. 10*

$B = 4 \times b_2 + 2 \times b_1 + b_0$
BLANKING (NS) = $60 + 20 \times B$

*Fig. 11a*

| DATA BIT | AVERAGE FREQUENCY DEVIATION (HERTZ) | PHASE (DEGREES) |
|---|---|---|
| 000 | +3100586 | +90 |
| 001 | +1025391 | +90 |
| 010 | -3100586 | +90 |
| 011 | -1025391 | +90 |
| 100 | +3100586 | -90 |
| 101 | +1025391 | -90 |
| 110 | -3100586 | -90 |
| 111 | -1025391 | -90 |

```
FOR (n = 2 ; N <= DATA ; n++)
    IF ((SS[n] == 1) && (SS[n-1] == 1))
        IF ((SLIN_Q[n-1] != SLIN_Q[n]) && SLIN_Q[n] == 1))
            SLOPE[n] = SLIN_I[n]
```

RADIO TAG FOR LFM RADAR

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

A basic transponder receives a signal from a SAR (synthetic-aperture radar), and then retransmits the signal back to the SAR. The problem with retransmitting the signal back to the SAR without any changes is that the signal must compete with ground reflection noise from natural and cultural ground clutter. If no type of modulation is used, then to stand out above the background noise, extra power and electronics are often needed to increase the gain in the return signal, often requiring two antennas, one for receiving and one for transmitting. Most transponders do not provide any added information in the retransmitted signal. In most cases the interrogator is a SAR located in an aircraft or satellite, and a transponder is located some distance away from the radar, normally on the ground.

The ability to provide command control and communications to and from a transponder has many potential applications. Besides the military applications for battlefield management, intelligence gathering and the like, there are commercial applications which include transponder status, other environmental status and emergency response. A RFID (radio frequency identification) system contains two main elements, an interrogator and one or more transponders. In the radar transmission between the interrogator and transponder, a RF signal is encoded within the SAR pulse to provide information between the interrogator and transponder, that is normally unknown to the other element.

U.S. Pat. No. 5,486,830 discloses a RFID system wherein digital codes are encoded in the SAR signal that is received by a transponder, also called a RF tag or simply tag. A single antenna can be utilized by this transponder to transmit and receive signals. This is accomplished by a time-gating method using a 50% duty cycle factor for setting the tag's transmitting and receiving intervals, which are mutually exclusive. The received SAR signal is mixed with a reference oscillator to provide a detected signal that can be decoded. Tag logic and timing circuits measure the time between detected pulses and decode these pulses into downlink commands from the SAR, symbols of the downlink commands are encoded in the spacing between the SAR pulses. Downlink commands contain mode information that allows the SAR and tag to obtain a common pulse index (coarse synchronization). However, in order to achieve fine synchronization the tag must average the measured time-of-arrival of a number of pulses. After fine synchronization is achieved, and if so commanded, the tag will go into the uplink mode. The tag device phase encodes its echo with a sequence containing both prescribed and periodic or pseudo-random patterns, containing status or information unknown to the radar source's signal processor. A bi-phase (0/pi) modulator is utilized to allow selective amplification of +1 or −1 of the signal before retransmitting the signal back to the SAR. The signal processing at the SAR mixes a sequence identical to the prescribed periodic or pseudo-random selective amplification against the received echoes. This selective amplification spreads the spectrum of the natural or cultural echoes and de-spreads the tag's echo, making the retransmitted signal stand cut above the natural or cultural noise.

SUMMARY OF THE INVENTION

The present invention is an improvement over the other RFID systems. Prior art used simple pulses defined by their spacings in the SAR pulses. The pulses represent symbols that encode the digital information contained in the SAR pulses.

The present invention uses SAR LFM (linear frequency modulation) pulse waveforms. One advantage of using LFM pulse waveforms is that these waveforms are not noise sensitive. While the symbols of the encoded digital code are determined by the time internal between the pulses as in U.S. Pat. No. 5,486,830, noise can cause an incorrect interval to be detected and thereby generate an invalid message.

Two receivers, an AM and a FM receiver, are connected to an antenna and are used to demodulate their respective components of the LFM pulse waveform. The output of the AM receiver is the demodulated envelope that is proportional to the amplitude of the AM component of the LFM pulse waveform. The amplitude and time duration are compared to a preprogrammed threshold and time duration criteria. The preprogrammed criteria are stored in the tag DSP (Digital Signal Processor. If both the threshold value and time duration are determined to be valid, then the demodulated FM portion of the LFM pulse waveform is checked for validity.

A reference local oscillator is needed to demodulate FM signal component of a LFM pulse waveform. This is generated by delaying LFM pulse waveform and mixing it with the non-delayed LFM pulse waveform. A separate reference oscillator is, therefore, not required. The demodulated waveform is then passed through a zero-crossing detector. The output of the zero-crossing detector is sampled and the samples are counted by the DSP to estimate the average frequency over the pulse duration.

In order to determine the slope of the frequency deviation, a 90° power splitter is added to the local oscillator, before the mixer. The power splitter has two outputs, one in-phase and one in quadrature-phase with the LFM pulse waveform. The signal component set of mixer, lowpass filter, zero-crossing detector and sampler is replaced with two identical sets of components. The output of the set with the in-phase signal is labeled "FM In-Phase", and the output of the set with the quadrature-phase signal is labeled "FM quadrature-phase". These two outputs are then used by the DSP to determine the slope of the frequency deviation.

The DSP utilizes the slope information and frequency deviation to determine the message sent by the SAR. Though the use of Phase Modulation (PM), the tag can encode data to send back to the SAR.

By using RF switches, the signals can be directed so that the same antenna can be used for receiving and transmitting. Since the same antenna is used, a chop timing of the RF switches is required. There are 3 stages in the chop signal: receive, transmit and blanking. The blanking stage is required to prevent oscillations in the tag due to reflections from nearby objects. Some systems require randomizing the blanking time to prevent the radar from accidentally locking onto the spectral lines that are generated during the chopping of the RF signal. The blanking times can change pseudo-randomly each cycle.

BRIEF DESCRIPTION OF THE DRAWINGS

Illustrative and presently preferred embodiments of the present invention are shown in the accompanying drawings in which.

DETAILED DESCRIPTION

Figure 1:
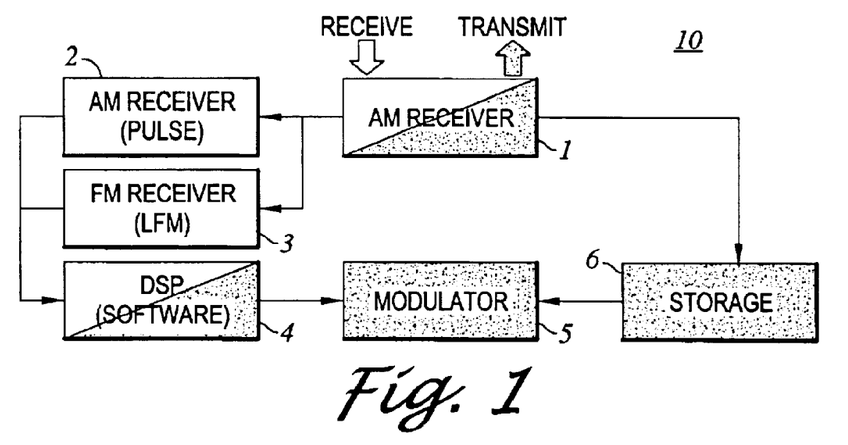
FIG. 1 is simplified block diagram of the tag.

FIG. 1 shows the transponder device or tag 10 simplified block diagram. An antenna 1 receives the LFM (linear frequency modulation) input waveform from SAR. The received waveform is then fed into the AM receiver 2, the FM receiver 3, and a storage element 6. The AM receiver 2 demodulated output signal is then fed into the digital signal processor (DSP) 4. If the DSP 4 determines that the AM demodulated output signal is valid, then the DSP 4 determines if the demodulated output of the FM receiver 3 is valid. If both demodulated outputs are valid, then the DSP 4 checks the validity of the received LFM input waveform against stored data. After the DSP 4 has determined that the data encoded in the LFM input waveform is valid, and decoded the message; the RF signal stored in the storage element 6 is modulated in the modulator 5. The output of the modulator 5 is then fed back into the antenna 1 to be transmitted back to the originating source.

Figure 2:
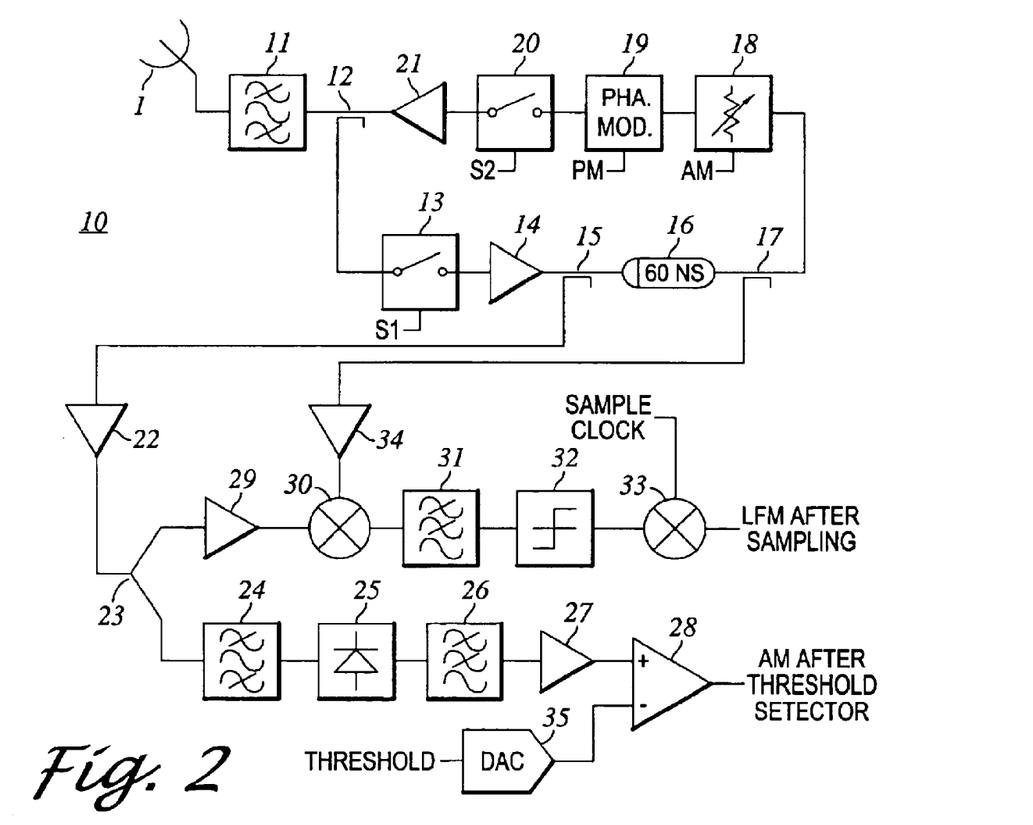
FIG. 2 is the detailed block diagram of the tag.

FIG. 2 shows a further breakdown of the components of the tag 10. The typical operating frequency is 8 to 12 GHz. The LFM input waveform is sensed in antenna 1. A bandpass filter 11 is utilized to remove any undesirable out of band signals out of the LFM input waveform. A first directional coupler 12 passes the filtered LFM input waveform to a RF switch 13 through the coupled side of the directional coupler 12. If switch 13 is closed, then the received filtered RF signal will be fed into a low noise amplifier 14. The RF switch 13 is only closed during the receive cycle. Switch 20 is open during the receive cycle. The RF filtered LFM input waveform is then routed through the coupled side of the second coupler 15. A second low noise amplifier 22 amplifies the signal, which is then fed into a power splitter 23. Up to the input of the power splitter 23, the LFM input waveform signal has been identically processed for both the AM receiver 2 and FM receiver 3.

Figures 3, 4:
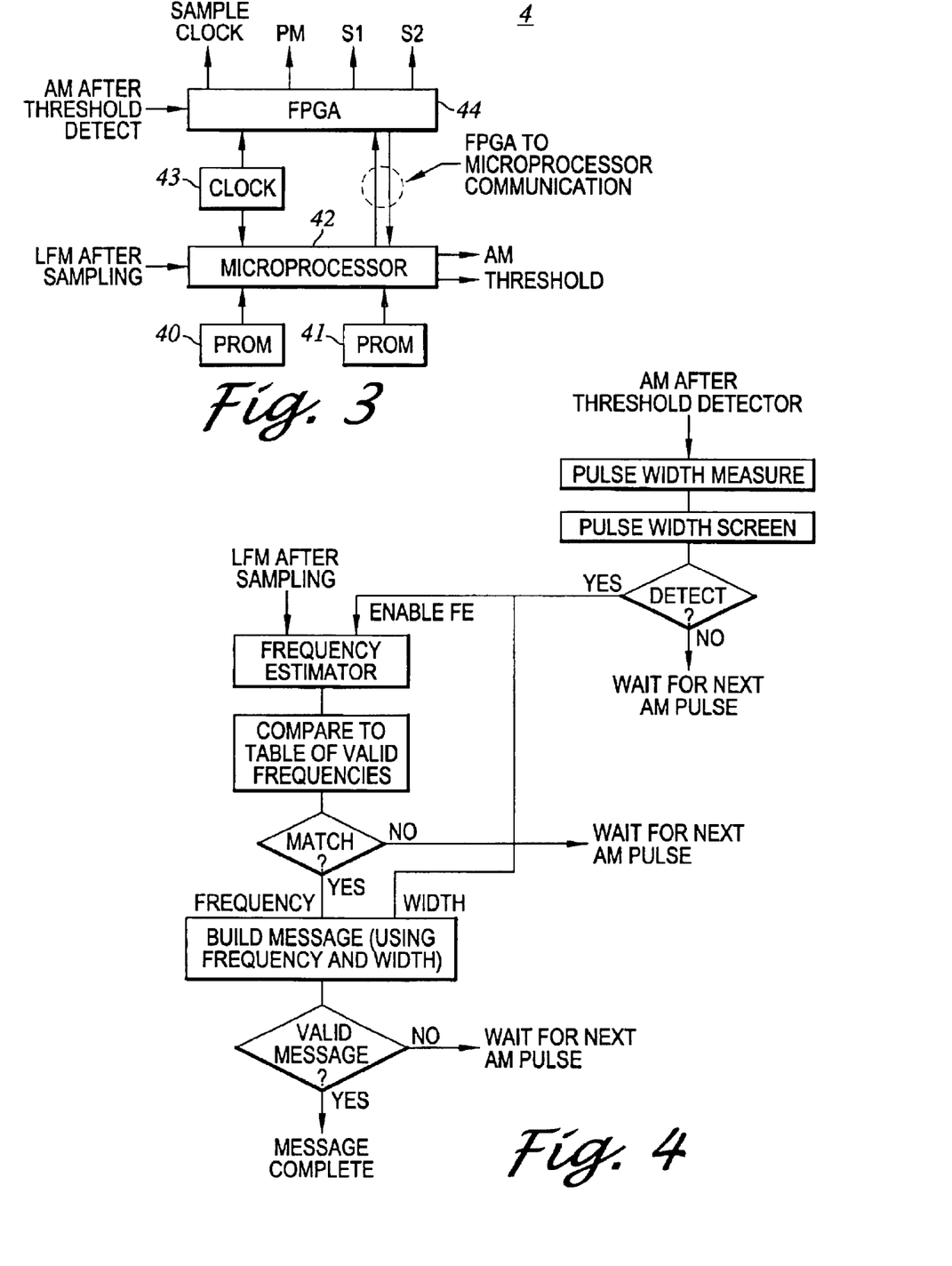
FIG. 3 is the detailed block diagram of the digital signal processor.
FIG. 4 is the software flow diagram during message reception.

The signal flow in the AM receiver 2 continues from the output of the power splitter 23 though the bandpass filter 24. Bandpass filter 24 removes unwanted out of band noise generated by the two previous amplifier stages 14 and 22. The output of filter 24 is applied to a diode detector 25. The detector 25 demodulates the envelope of the LFM input waveform; the output of detector 25 is proportional to the amplitude of the LFM input waveform. A square law device is used in the detector although other types of detector devices are possible, such as envelope, synchronous, and log-video; however the square law detector is one of the most common forms. In the preferred embodiment, the detector 25 consists of a tunnel diode and passive bias components and the design is not shown but is well known to practitioners of the art. The detected output of the detector 25 is filtered by a low pass filter 26, which removes the higher order frequency terms which were generated during the non-linear process of detection. A video amplifier 27 amplifies the filtered output of filter 26. The output of the video amplifier 27 is applied to the positive input terminal of a threshold comparator 28. The voltage at the negative input terminal of the comparator 28 is set by a digital to analog converter (DAC) 35. The output of the DAC 35 is determined by the digital word from the DSP 4. The output of the comparator 28 is a digital logic "1" when the input at the positive input terminal is higher than the voltage at the negative input terminal. The output of comparator 18 is a logic "0" when the input at the positive input terminal is lower than the voltage at the negative input terminal. The output of the comparator 28 is labeled "AM After Threshold Detection" in FIG. 2 and is applied to a field programmable gate array (FPGA) 44 contained in DSP 4 shown in FIG. 3. The FPGA 44 measures the pulse width of the comparator 28 output. This pulse width is screened to be within the programmable minimum and maximum limits, which typically range between 10 μs to 150 μs. A pulse width, that does not pass the pulse width screening, will not enable the frequency estimator within the DSP 4, as shown in FIG. 4, the tag software flow diagram. An invalid pulse will cause no action in the frequency estimator. Only after a pulse width has passed the pulse width screening will the frequency estimator be enabled.

Figure 5:
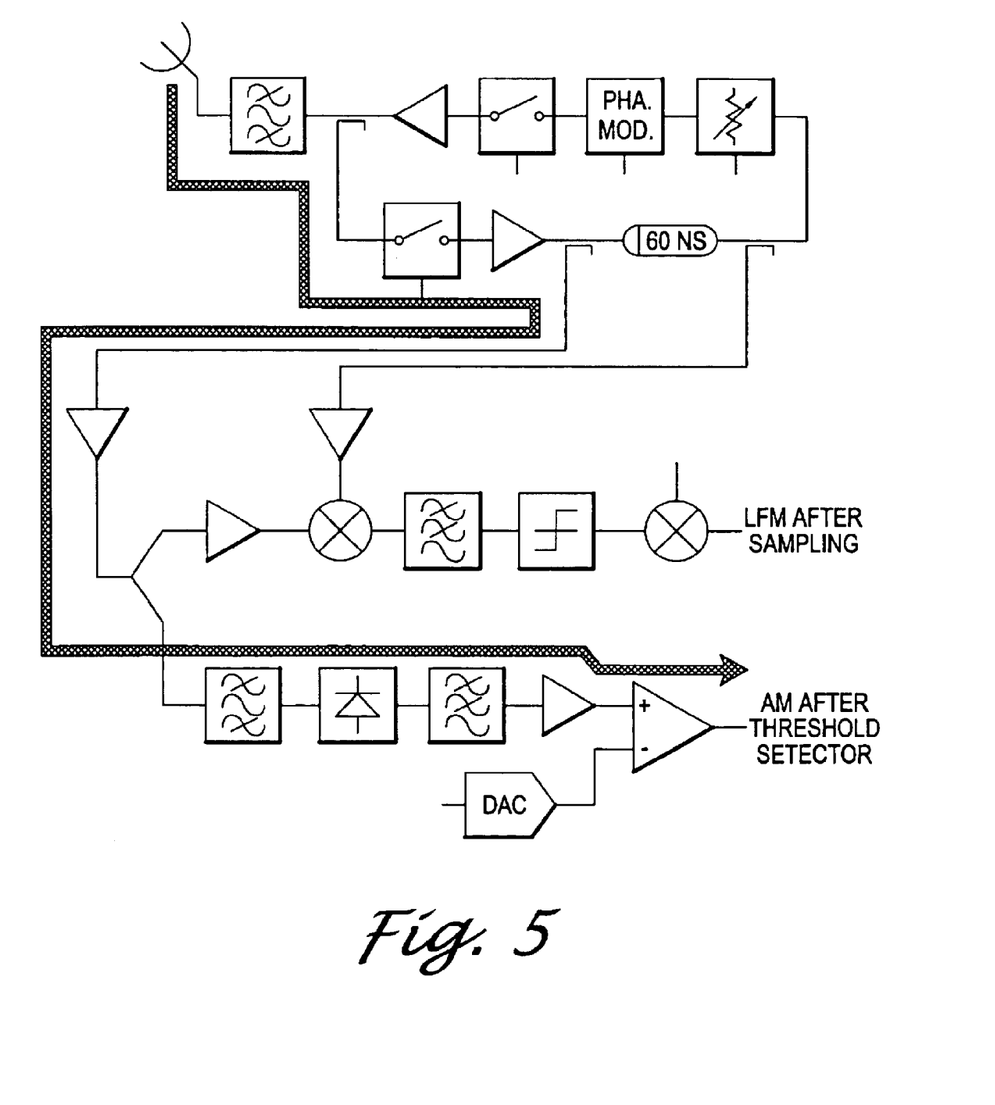
FIG. 5 is the signal flow through the AM receiver.
Figure 6:
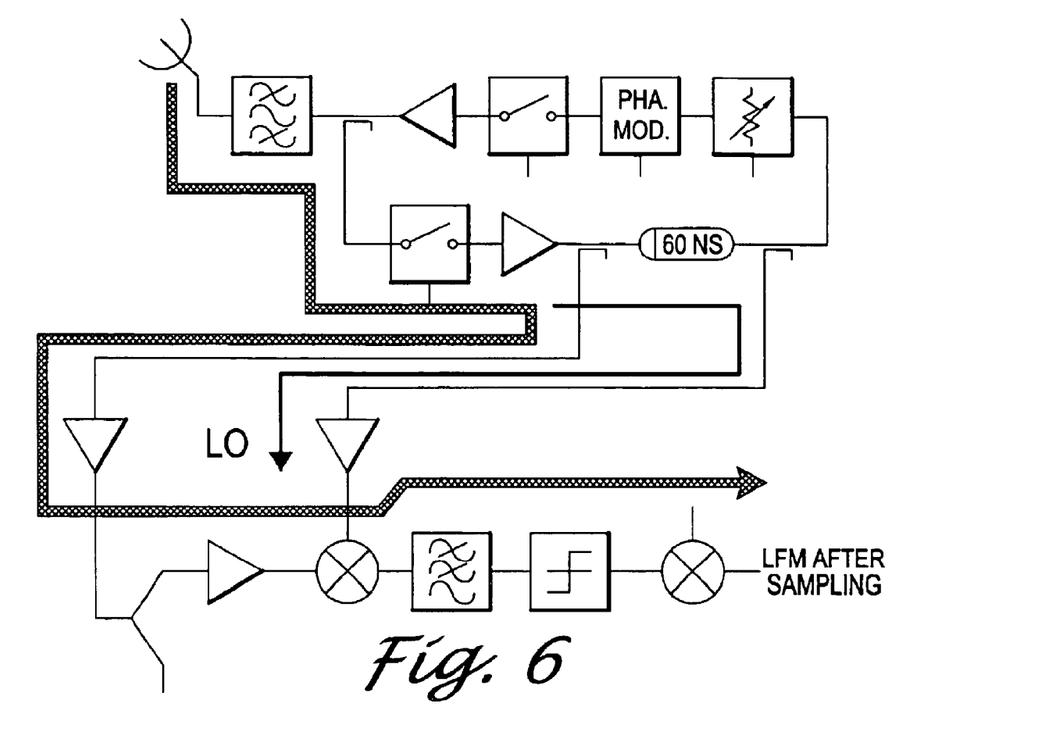
FIG. 6 is the signal flow through the FM receiver.

The signal flow in the FM receiver 3 continues from the output of the power splitter 23 though the low noise amplifier 29. The FM receiver shares common parts with the AM receiver 2 from the antenna 1 to the input of power splitter 23 as illustrated in FIGS. 2, 5 and 6. In the FM receiver is a new input signal labeled "LO" (Local Oscillator) which is utilized as shown in FIG. 6. This signal is generated from the input LFM pulse waveform that shares common parts with the AM receiver and FM receiver from the antenna 1 to the input of the second directional coupler 15, as illustrated in FIGS. 2, 5 and 6. At the coupler 15, the signal passes through the main line of second directional coupler 15, and then through the delay line 16. The time delay, of the delay line 16, in the preferred embodiment is 60 ns with the delay element being a coaxial cable. However, the design of the delay line 16 will operate with any delay as long as the delay is constant over frequency. Other delay elements can be used such as SAW, BAW, optical fiber, tuned filter and digital circuits such as DRFM. These alternate delay elements may require support circuits that are not shown here, but are well known in the art. The output of delay line 16 then passes through the coupled side of the third directional coupler 17. The output of the third directional coupler 17 then passes through the LO low noise buffer amplifier 34. The output of the buffer amplifier 34 is then fed into the LO input of the mixer 30.

The LO signal at the mixer 30 input is a delayed replica of the LFM input waveform received at the antenna 1. This LO signal and the mixer 30 comprise the frequency detector in the FM receiver 3 of the original LFM pulse waveform. The frequency demodulation is accomplished by multiplying the delayed signal (LO) with the non-delayed signal in the mixer 30. The formula for the demodulation output of the low pass filter 31 after the mixer 30, for an LFM input, is given below:

Frequency output (Hz)=delay (seconds)×LFM (Hz/second).

Figure 7A:
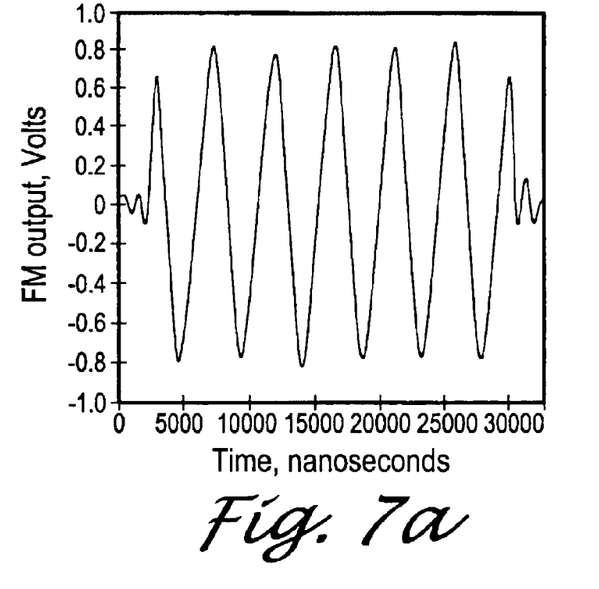
FIG. 7a is a graph of the low pass filter output of the FM receiver.

The following is an example calculation of the above formula. The tag has a time delay of 60 ns, and an input LFM waveform is applied at 8.5 GHz with a positive-slope ramp deviation of 100 MHz and a pulse width of 27.7 µs. The frequency output is 60e-9×100e6/27.7e-6 or approximately 216 KHz. FIG. 7 shows the output of the low pass filter 31 for this input signal.

After the low pass filter 31, the FM signal is limited with a zero-crossing comparator 32 that converts the signal into a one bit digital value and the sampling of the one bit digital value is controlled by the Sample Clock input, from the FPGA 44 of the DSP 4 as shown in FIG. 3, to the sampler 33. Sampler 33 may be a clocked register or an other circuit that can hold the value of the digital bit until the next sample clock is received by the sampler 33. The output of sampler 33 is labeled "LFM After Sampling". The output of sampler 33 is applied to the microprocessor 42 in the DSP 4 in FIG. 3, for storage in the memory RAM 41 for further processing by the microprocessor 42. It is only processed if the output of comparator 28 is within the preprogrammed valid range of widths.

Figure 7B:
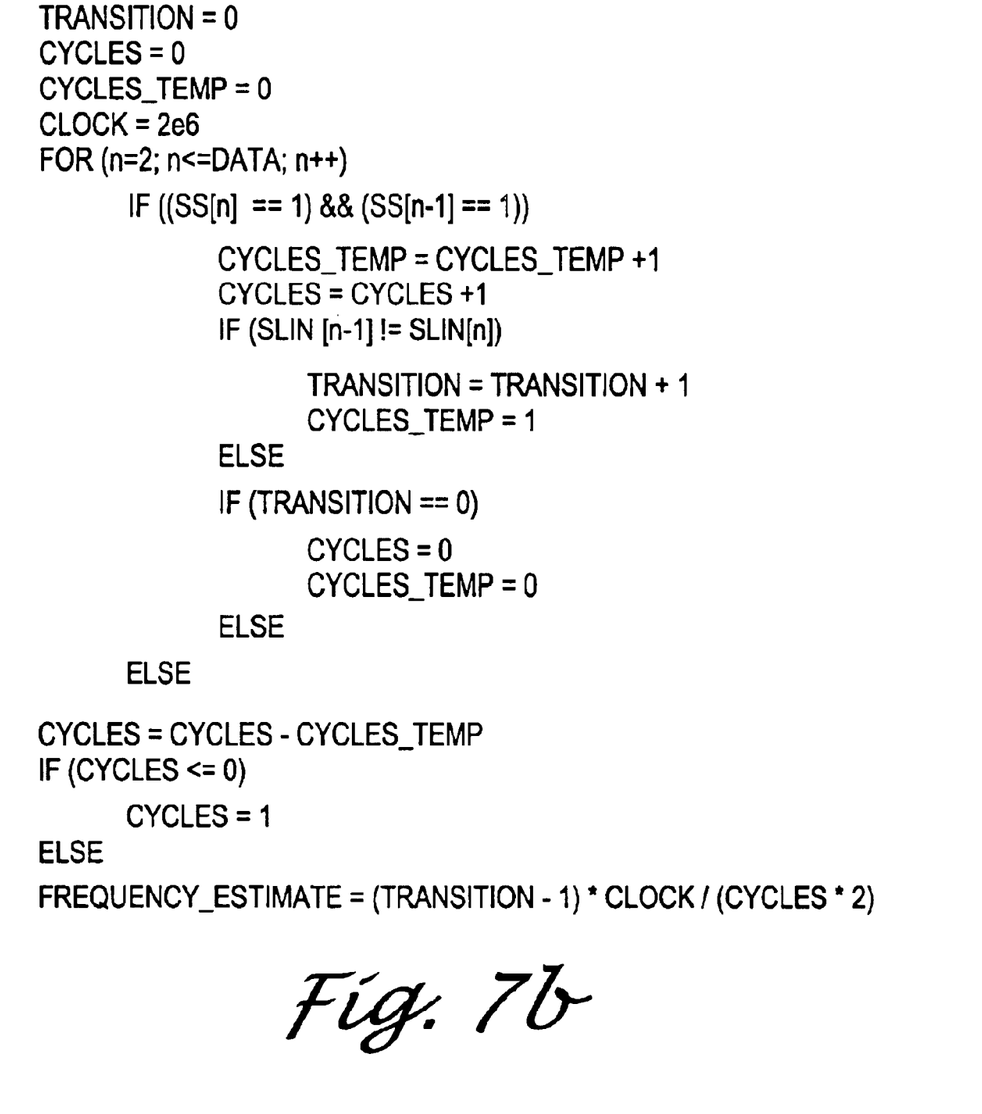
FIG. 7b is a table showing the frequency estimator code.

FIG. 4 is a diagram of the processing steps of the microprocessor. The output of the FM receiver 3, which is the output of the sampler 33, is fed into the microprocessor 42 for frequency estimating. The frequency estimator counts the zero-crossings of the demodulated FM signal from the output of sampler 33, and calculates the average frequency during the valid receive interval. The code for this frequency estimator is provided in FIG. 7B. In FIG. 7B, the variable "SS" represents a valid receive interval. If the variable "SS" is not equal to 1, then the output of the threshold comparator 28 is not a digital logic 1. All received signals that do not generate a digital logic 1 at the output of comparator 28 are considered to be noise and are not processed further. The variable "SLIN" is the digital bit in the output signal or comparator 33 labeled as "FM After Sampling". The variable "clock" is a 2 MHz sample clock. The actual frequency can be changed but the program must make the variable "clock" equal to the actual sample clock rate used. The variable "data" is the sample length. The sample length dynamically changes with the width of the input pulse.

In the previous example, the sample length would be 2 Mhz×27.7 µs, or approximately 55 samples. Using the frequency estimator of FIG. 7B and the 100 MHz deviation from the example, the calculated frequency output is 219 KHz. This is within 2% of the theoretical value of 216 KHz and is satisfactory for the RFID system. The FM processing continues in FIG. 4, where the measured frequency is compared to a table of valid frequencies. If the comparison is true, then the tag builds a message from the data that was encoded in the pulse width and frequency deviations of the received input LFM pulse waveform. Although this implementation is described in software, faster operation could be obtained using a matched filter in the DSP section.

The tag 10 checks the validity of the data in the message by examining the data fields and performing a checksum. An example of a checksum is the CCITT 16 bit CRC (cyclic redundancy check). However, other types of checksum may be used since the type of checking does not materially affect the performance of the tag. The tag's 10 checksum is compared with the transmitted checksum and if they match then the message is valid and the tag declares Message Complete. A valid message will typically contain the radar pulse width, radar PRI, and transmitted checksum, and may include other information for the tag 10 or about the radar depending on the system operation.

Figure 8:
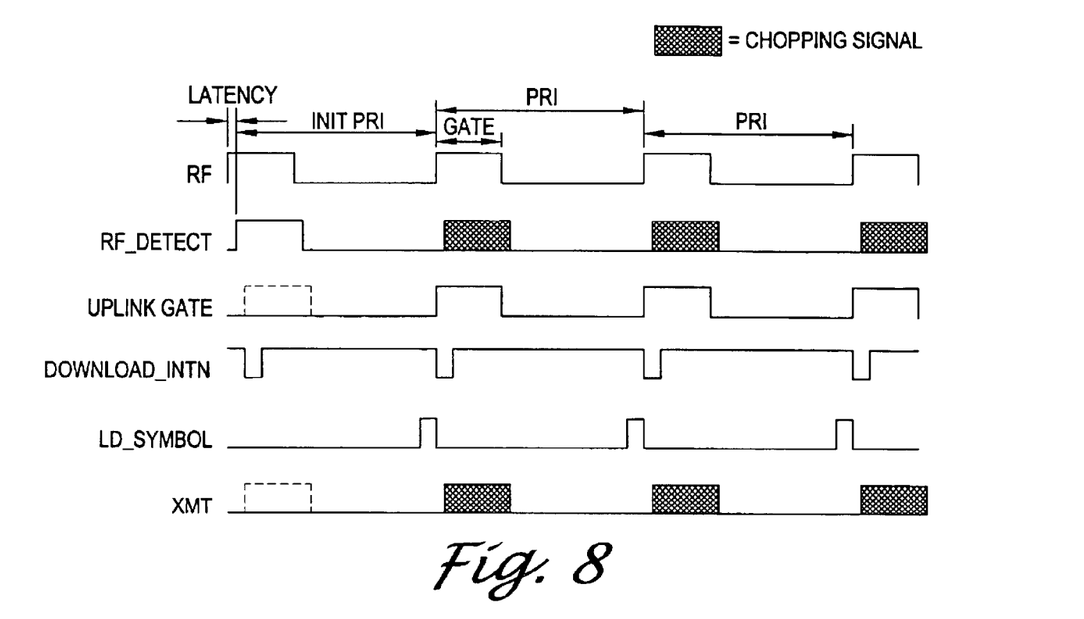
FIG. 8 is a timing diagram for synchronizing the tag and radar.
Figure 9:
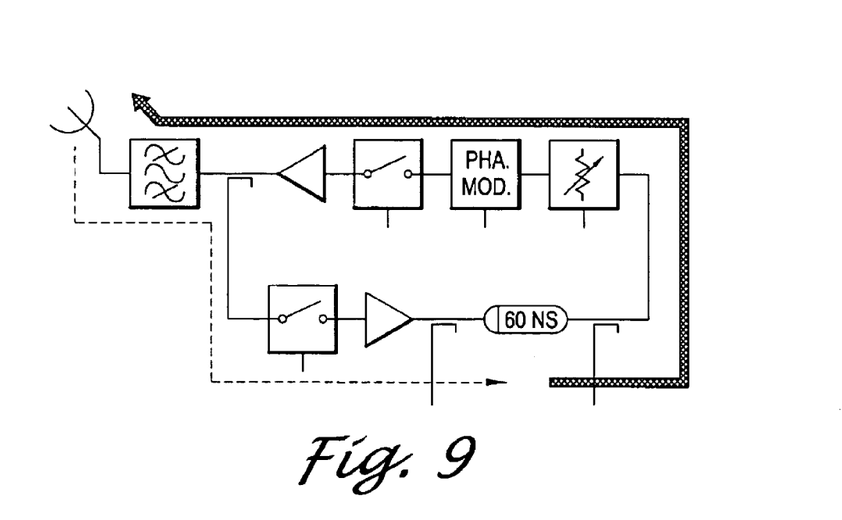
FIG. 9 is the signal flow during transmit.

A valid message will enable data transmission from the tag 10. The tag 10 must align its transmission so that its pulse is on top of, or synchronous with, the radar pulse. The tag 10 does this by loading the initial radar pulse width and radar PRI (pulse repetition interval) in a counter of the DSP 4, but not starting the counter. These values in the counter are the pulse width and PRI from the valid message that were obtained after the tag declares Message Complete. At the starting edge of the initial radar pulse, a digital control signal, download_intn, is generated, which is a request by the FPGA 44 to the microprocessor 42 for modulation data. This data is used in the validating of any decoded valid AM and FM demodulated output to the DSP 4. From the data decoded from the initial SAR pulse, the tag 10 estimates when the next pulse will be received. The exact timing for the ld_symbol during the initial pulse is not critical, however the ld_symbol must occur before the first transmit pulse. The download_intn is a request from the FPGA 44 to the microprocessor 42 for new modulation data. This data is used in the next pulse one PRI later. Ld_symbol latches the modulation data into the FPGA 44 before rf_detect occurs. The tag 10 waits for the leading edge of the initial radar pulse and when it detects the leading edge it transmits after the initial PRI. During the following pulses the tag loads the counter with the actual radar PRI and so transmits this PRI repeatedly. The PRI timer gets resynchronized to each incoming RF to take into account inaccuracies in the FPGA clock. After the initial PRI, an uplink gate signal is generated to control the waveform XMT, which is the envelope of the RF transmission from the tag. In this way the tag 10 becomes synchronized with future pulses from the radar. The error between the tag pulse and radar pulse is typically less than ±100 ns. The process of synchronizing the tag with the radar is illustrated in FIG. 8. The following is a description of the signals named in the figure:

"rf" is the envelope of the received RF signal in the LFM pulse waveform;

"latency" is the time delay from the received RF to the digital output of the threshold detector 28, labeled as "AM After Threshold Detector", and occurs due to circuit delay in the AM receiver 2;

"init_pri" is the initial PRI transmission from the tag 10;

"gate" is the width of the received LFM pulse waveform;

"pri" is the PRI of the received LFM pulse waveform, and the PRI of all tag transmissions except for the initial PRI;

"rf_detect" is the same as the output of the threshold detector 28, labeled as "AM After Threshold Detector";

"uplink gate" is the pulse width of the tag transmission;

"download_intn" is a digital word signal sent by the FPGA 44 to the microprocessor 42 and is a request to the microprocessor 42 for modulation data;

"ld_symbol" initializes the FPGA 44 with new modulation information from the microprocessor 42;

"xmt" is the envelope of the RF transmission from the tag 10;

"chopping signal" refers to a toggling state of the controlling signals S1 and S2 that control RF switch S1 13 and RF switch S2 20 respectively The LFM pulse waveform signal flow during transmit is shown in FIG. 9. The dashed line was previously described n the received signal flow and is also part of the transmission. The LFM input pulse waveform uses the same components as the AM 2 and FM 3 receivers up to the input of the second directional coupler 15. The LFM pulse waveform signal passes through the main line of second directional coupler 15, followed by the delay line 16. It then passes through the main line of third directional coupler 17. The LFM pulse waveform signal that was stored in delay line 16, after passing through the directional coupler 17 is electrically coupled to the variable attenuator 18, phase modulator 19, RF switch S2 20 (closed in transmit), power amplifier 21, back through the main line of the first directional coupler 12 and through bandpass filter 11 and transmitted from the antenna 1.

Figure 10:
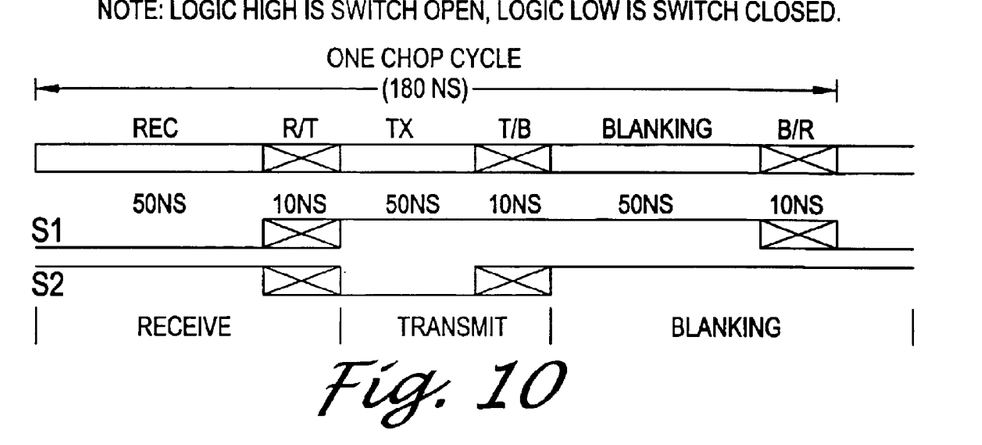
FIG. 10 shows the chop timing of S1 and S2.

To allow the tag to share the same antenna 1 for both receive and transmit, the chopping signals S1 and S2 use the same frequency and the length of delay for the delay line 16 is based on the frequency used in the timing of chopping signals S1 and S2. The timing of S1 and S2 is shown in FIG. 10 for a 60 ns delay line 16. In this figure the receive time is 60 ns, transmit time is 60 ns, and the blanking time (when the tag is neither transmitting nor receiving) is 60 ns. The transition time from on to off and vice versa due to the RF switches S1 13 and S2 20 is 10 ns. A complete cycle in the example in FIG. 10 is 180 ns. The blanking interval in FIG. 10 prevents oscillations due to reflections from nearby objects.

Figure 11A:
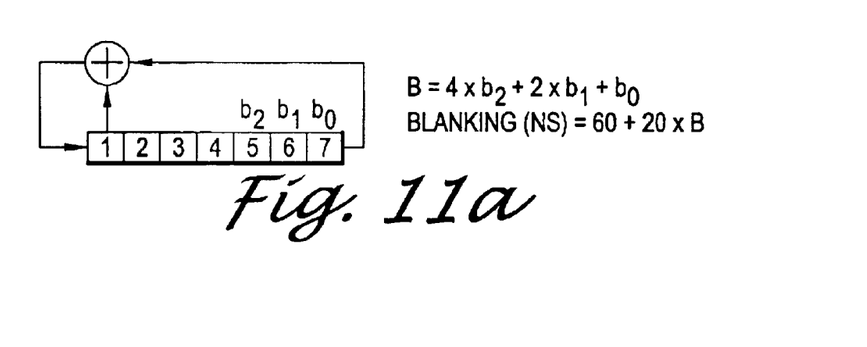
FIG. 11a is a diagram of the random chop generator.

Some systems require randomizing the blanking time to prevent the radar from accidentally locking onto the spectral lines that are generated during the chopping of the RF signal. The randomizing circuit for chop timing is shown in FIG. 11a. The blanking time changes pseudo-randomly each cycle from 60 ns to 200 ns with a resolution of 20 ns. The design is a [7,1] maximal length generator and the initial seed is binary 1111111. The sequence repeats every 127 chop cycles. The circuits for the chop timing and chop randomization are contained in the FPGA 44. Other randomizing circuit designs could also be utilized.

Figure 11B:
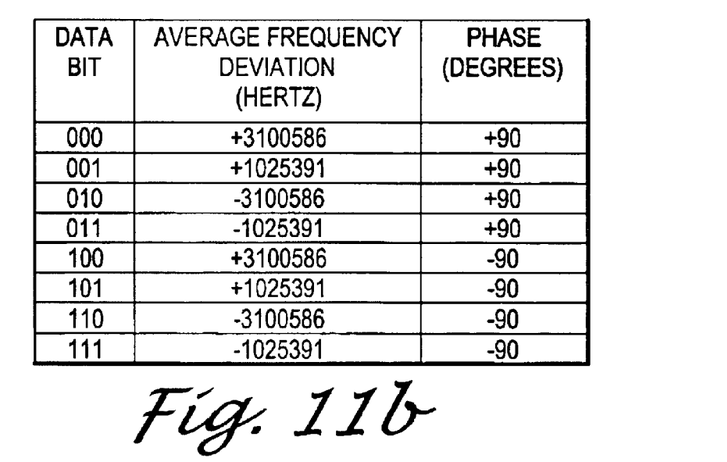
FIG. 11b is a table showing the tag modulation states per pulse.

The pulse is modulated with tag data using the signal phase modulator 19 as shown in FIG. 2, by the signal labeled "PM". The phase modulator 19 is a 5-bit phase shifter and is capable of placing frequency modulation and phase modulation on the RF signal. A typical modulation consists of a linear frequency slope and a bi-phase value. During the process of modulation, the binary data in the message is encoded. An example of an encoding scheme is shown in FIG. 11b Three bits of data from the tag are placed on each pulse using different states of frequency deviation and phase. However, the tag is capable of generating other modulation values, and the design is capable of a broad range of frequency and phase modulation.

Figure 12:
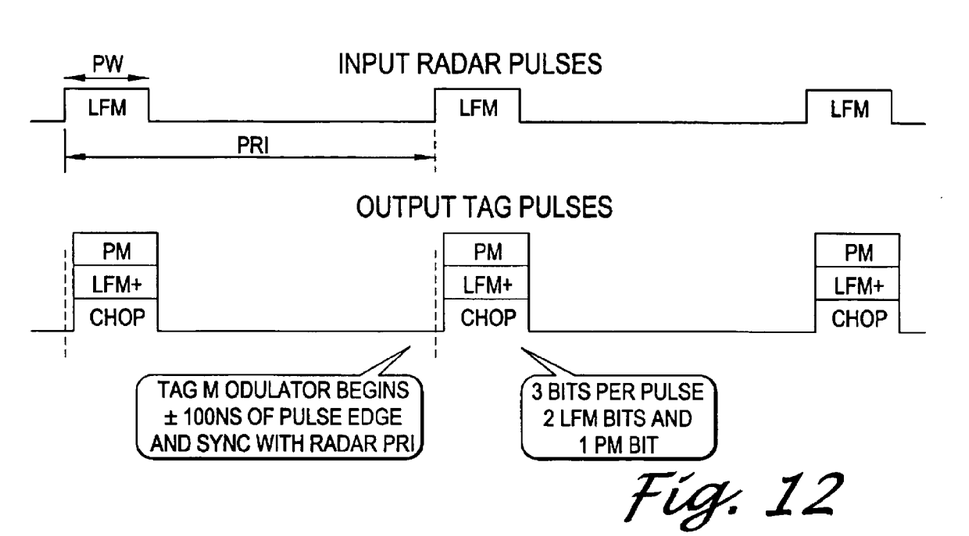
FIG. 12 shows the tag modulation.

The RF output from the tag 10 for the example in FIG. 11b is shown in FIG. 12. It shows that the tag adds chop modulation, phase modulation, and linear frequency modulation (LFM) to the radar pulse. The transmit time of the tag is synchronous with the radar pulse. The plus symbol in the LFM+ indicates that the tag has modified the LFM slope of the original radar LFM signal.

The tag adjusts the gain in the transmit path using the AM signal at the variable RF attenuator 18 in FIG. 2, the signal being generated from the microprocessor 42 in FIG. 3. The AM signal controls a 5-bit digitally tunable RF attenuator. However, the signal may also be an analog voltage in another implementation and the type of RF attenuator does not materially affect the tag 10. The microprocessor 42 sets the amplitude value of the AM. The gain is typically set to 63 dB (peak) as measured from the antenna RF input to the antenna RF output.

FIG. 13a is a partial block diagram of the FM receiver 3 in FIG. 2. These components can not distinguish between increasing and decreasing LFM signals, because they respond equally to positive and negative slopes from the FM signal. The preferred embodiment uses a mixer 30, followed by a low pass filter 31, a zero-crossing detector 32 and a sampler 33. The output of the sampler 33 is labeled LFM After Sampling. This output is then processed by the microprocessor 42 in the DSP 4.

Figure 13:
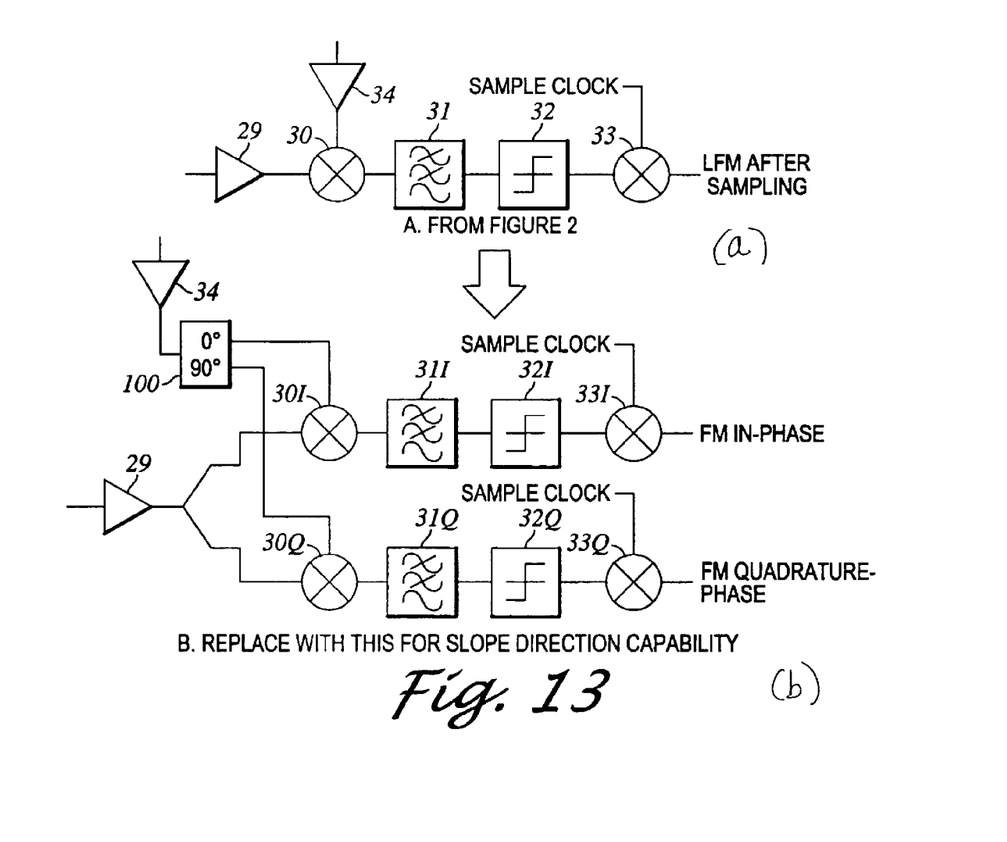
FIG. 13a shows the FM receiver without slope direction.
FIG. 13b shows the FM receiver with slope direction capability.

This restriction is overcome by quadrature detection and processing of the I and Q signals as shown in FIG. 13b of FIG. 13. FIG. 13b shows the block diagram of the revised design for calculating the slope. The amplifiers 29 and 34 are unchanged from the preferred embodiment. A 90° power splitter 100 is now placed between the output of amplifier 34 and mixer 30. The 90° power splitter 100 produces two outputs, one is in-phase with the input signal and the other output is out of phase by 90° and is in quadrature-phase with the input. Each output is processed by a separate but identical set of components. The outputs of the two sets of components are labeled "FM In-Phase" (I) and "FM Quadrature-Phase" (Q). The output from the revised FM receiver 3 labeled "FM in-phase" uses the component set: mixer 30I, lowpass filter 31I, zero-crossing detector 32I and sampler 33I. The output from the revised FM receiver 3 labeled "FM Quadrature-Phase" uses the component set: mixer 30Q, lowpass filter 31Q, zero-crossing detector 32Q and sampler 33Q.

Figure 14A:
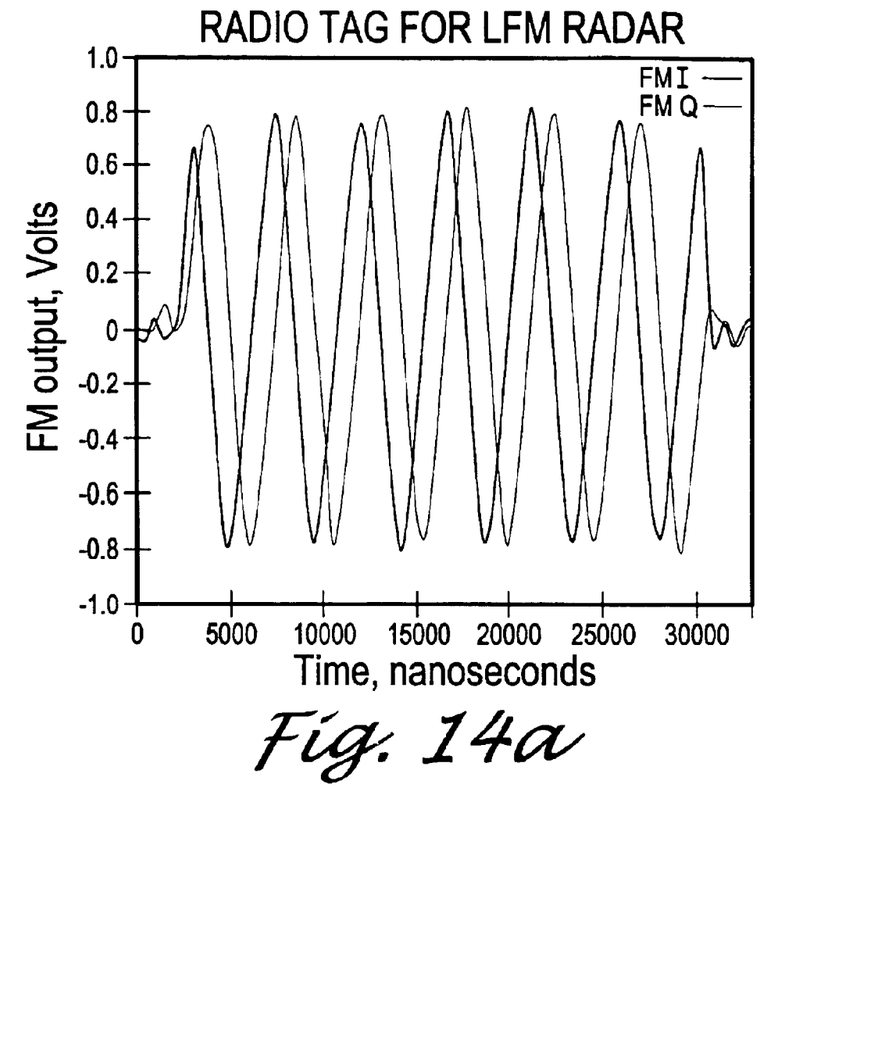
FIG. 14a shows a graph of the I and Q outputs of the FM Receiver.

These two output signals are further processed by the microprocessor 42 in the DSP4, to find the polarity of the slope. The analog outputs of I and Q prior to digitizing are shown in FIG. 14a, using the same input example as previously discussed.

Figure 14B:
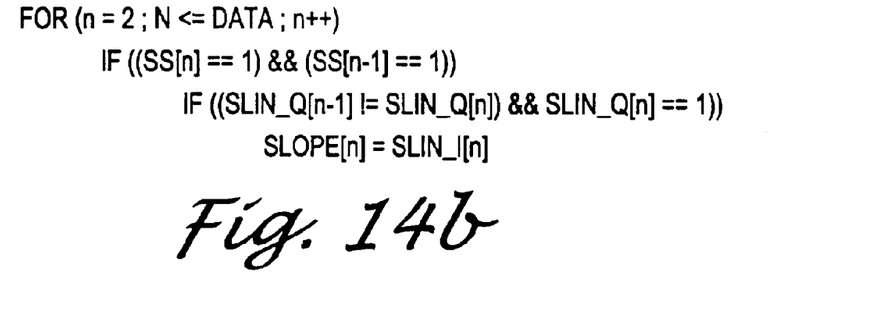
FIG. 14b is a table showing the slope measurement code.
Figure 15:
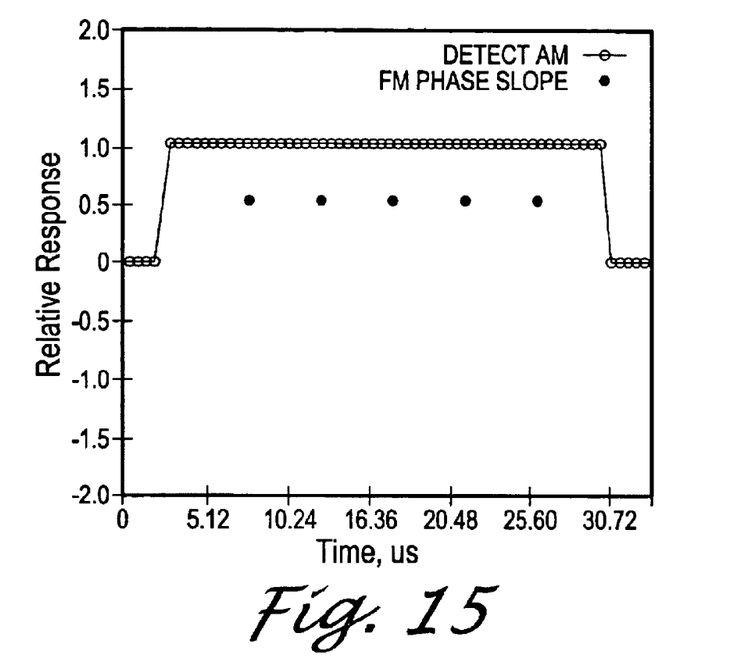
FIG. 15 shows the slope polarity of a positive-going LFM.
Figure 16:
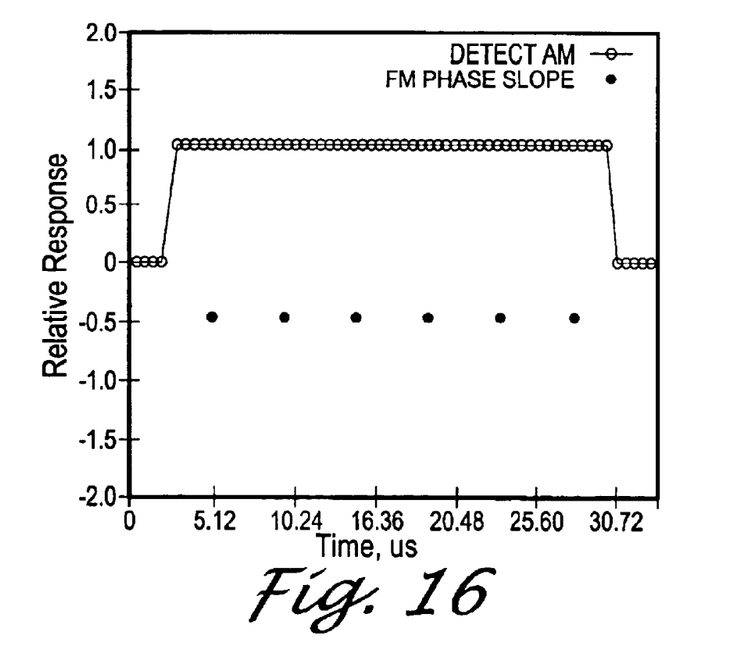
FIG. 16 shows the slope polarity of a negative-going LFM.

The processing steps for the slope polarity are shown in FIG. 14b. SLOPE[n] is the output and is initialized to zero. The result is +1 when the slope is positive and −1 when the slope is negative. The data processing is accomplished by the microprocessor 42 inside the DSP 4. The output of the slope polarity is shown in FIG. 15 for the positive slope of the example. The top trace is the detection output of the AM receiver 2 threshold comparator 28 and is shown for reference only, and the bottom trace is the slope polarity scaled by ½. FIG. 16 is the output for a negative slope.

The algorithm in FIG. 14b provides multiple outputs, separated in time but having identical value, and any one of the multiple values is suitable for defining polarity. Typically the microprocessor 42 will select the first value. The number of multiple values is a function of the input FM deviation and pulse width.

The above teachings are illustrations of preferred embodiment of the present invention. It should be noted that modifications to the invention, such as would occur to those of ordinary skill in the art, are also within the intended scope of the present invention.

What is claimed is:

1. A tag apparatus, capable of detecting, decoding and validating a radar message contained in an AM and FM signal component of a received LFM (linear frequency modulation) pulse waveform from a radar source, and encoding and retransmitting, back to the radar source, a tag message contained in a PM and FM signal component of a modified LFM pulse waveform, the apparatus comprising:

a) an antenna input circuit for receiving the LFM pulse waveform having digital information;

b) an AM/FM signal component validation circuit, in electrical communication with said antenna, for detecting, decoding and validating said AM and FM components in the LFM waveform, and comparing the components to a predetermined criteria, in electrical communication with said antenna;

c) a delay element in electrical communication with the antenna for storing the received LFM pulse waveform;

d) a chopped repeater circuit, in electrical connection with the delay element for encoding the stored LFM pulse waveform in the delay element with a preprogrammed AM and a FM predetermined criteria to form a modified LFM pulse waveform;

e) timing synchronization circuitry for synchronizing the chopped repeater circuit of the modified LFM pulse waveform with reception of the received LFM pulse; and f) an antenna output circuit, in electrical communication with the chopped repeater circuit, retransmitting of the modified LFM pulse back to the radar source.

2. The apparatus as recited in claim 1, in which the AM signal component validation circuit further comprises a threshold comparator circuit to produce an AM After Threshold Detect signal when the amplitude deviations of a demodulated AM component envelope of the LFM pulse waveform, exceed a DAC(Digital-to-Analog Converter) threshold voltage, said DAC threshold voltage being produced from a preprogrammed DAC threshold voltage stored digitally in a DSP in the tag.

3. The apparatus as recited in claim 2, in which said AM signal validation circuit further comprises a time duration circuit, said time duration circuit validating the amplitude deviation time duration of the AM After Threshold Detect signal by comparing the AM After Threshold Detect time duration against a preprogrammed time duration criteria table contained within the DSP in the tag.

4. The apparatus as recited in claim 3, wherein said FM signal component validation circuit further comprises a FM demodulation circuit, said demodulation circuit including a mixer and a local oscillator, said local oscillator frequency being in electrical communication with the mixer and operative to generate a local oscillator frequency signal by passing the LFM pulse waveform through a fixed constant time delay element.

5. The apparatus as recited in claim 4, in which said FM signal validation circuit further comprises a frequency estimator circuit, said frequency estimator circuit being enabled when the AM After Threshold signal time duration has been validated by information in the preprogrammed time duration criteria table.

6. The apparatus as recited in claim 5, in which said FM signal validation circuit further comprises a frequency estimator circuit, said frequency estimator circuit including a zero-crossing circuit, said zero-crossing circuit being operative to convert the FM signal component into a one bit value, said one bit value being sampled by a clock and applied to the DSP, the DSP calculating an average frequency during the AM After Threshold time duration of the AM signal component of the LFM pulse waveform.

7. The apparatus as recited in claim 6, wherein said FM validation circuit further comprises a preprogrammed digital codes table for decoding a message contained in the received LFM pulse waveform.

8. The apparatus as recited in claim 7, wherein said AM/FM signal component validation circuit further comprises a slope polarity detector for determining the polarity of the slope, and comparing the slope to a slope criteria preprogrammed table for validation.

9. The apparatus as recited in claim 8, wherein said slope polarity detector includes a 90° power splitter in electrical communication with the delay element and its outputs, one at 0° and the other at 90° relative to the first output, in electrical communication with at least one frequency estimator circuit, the frequency estimator circuit outputs are inputs into the DSP(Digital Signal Processor), the DSP using a software program in determining the polarity of the slope, and comparing the slope to a slope criteria preprogrammed table for validation.

10. The apparatus as recited in claim 9, wherein the chopped repeater circuit further comprises a RF attenuator for the amplitude of the modified LFM waveform and a phase modulator for modifying the amplitude, phase modulation and frequency modulation of the stored LFM waveform and thereby generating the modified LFM waveform.

11. The apparatus as recited in claim 10, wherein the phase modulator further comprises a phase shifter that is controllable up to a 5-bit resolution, that is in electrical communication with the delay element for receiving the stored LFM waveform and generating the modified LFM waveform.

12. The apparatus as recited in claim 11, wherein the phase shifter further comprises an attenuator that is controllable up to a 5-bit resolution.

13. The apparatus as recited in claim 1, wherein said timing synchronization circuitry is connected to the DSP, and is operative to generate a chopping signal that is preprogrammed.

14. The apparatus as recited in claim 13 wherein the timing synchronization circuit is controlled by the DSP for generating a random or pseudo-random modified LFM waveform transmission from a predetermined criteria table.

15. The apparatus as recited in claim 14, wherein the chopping signal comprises a blanking signal portion, said blanking signal portion is generated when the tag apparatus is neither receiving nor transmitting.

16. The apparatus as recited in claim 1, further comprising a plurality of RF switches, said plurality of RF switches being operative to receive the LFM pulse waveform and the modified LFM waveform and to selectively direct only one of the received LFM pulse waveform and the retransmitted modified LFM pulse waveform to the antenna.

17. The apparatus as recited in claim 16, in which the chopped repeater circuit is operative to synchronize the transmission of the modified LFM waveform to a front edge of a received pulse of the LFM pulse waveform from the radar source.

18. The apparatus as recited in claim 17, wherein the delay element is selected from a group comprising a coax cable, SAW, BAW, optical fiber, tuned filters and DRFM digital circuits.

19. The apparatus as recited in claim 18, wherein RF switches are operative to select between the input and output circuits of the antenna, thereby permitting the use of a single antenna.

20. A method of decoding and encoding digital information contained within amplitude and frequency modulated components of a received LFM pulse waveforms from a radar source, the method comprising the steps of:
 a) receiving the LFM pulse waveform;
 b) detecting the amplitude deviation of the LFM pulse waveform using an AM receiver;
 c) detecting frequency deviations in the LFM pulse waveform using an FM receiver;
 d) determining if the received demodulated amplitude and frequency deviation components of the LFM pulse waveform satisfies a predetermined criteria;
 e) comparing preprogrammed time duration criteria data to the deviation components of the LFM pulse waveform;
 f) decoding the digital information in the received LFM waveforms having components that satisfy the time duration criteria;
 g) communication of the decoded information to a tag;
 h) generating tag transmit data in response to the decoded information;
 i) storing the received RF signal for possible retransmission;
 j) encoding tag transmit data in the stored RF signal using PM and FM, the deviation components being stored data in a preprogrammed criteria table;
 k) chopping the RF signal during transmission; and
 l) transmitting the modified LFM pulse waveform in sync with the reception of an LFM pulse waveform with the encoded tag data.

21. The method of claim 20, further comprising the step of detecting the phase slope of the frequency deviations in the LFM pulse waveform.

22. The method of claim 21, further comprising the step of randomizing the length of the time duration of the chopped RF signal during tag transmission.

23. The method of claim 22, further comprising the step of adding a blanking signal time within the time duration of the chopped RF signal.

24. The method of claim 23, further comprising the step of synchronizing the transmission of the modified LFM pulse waveform with the leading edge of a front edge of a received pulse of the LFM pulse waveform from the radar source.

25. The method of claim 24, further comprising the step of selectively enabling a single antenna to either receive the LFM pulse waveform and transmit the modified LFM pulse waveform.

26. The method of claim 21, further comprising the step of pseudo-randomizing the time duration of the chopped RF signal during tag transmission.

* * * * *